United States Patent
Casamor et al.

(10) Patent No.: US 12,428,567 B2
(45) Date of Patent: Sep. 30, 2025

(54) METHOD FOR PURGING PAINT CIRCUITS AND WATERBORNE PURGE CLEANER

(71) Applicant: CHEMETALL GMBH, Frankfurt (DE)

(72) Inventors: Jose M. Casamor, Barcelona (ES); Miguel Angel Jaen Franco, Canovelles (ES); Jordi Girbau, Canovelles (ES)

(73) Assignee: CHEMETALL GMBH, Frankfurt (DE)

( * ) Notice: Subject to any disclaimer, the term of this patent is extended or adjusted under 35 U.S.C. 154(b) by 780 days.

(21) Appl. No.: 17/600,295

(22) PCT Filed: Mar. 19, 2020

(86) PCT No.: PCT/EP2020/057566
§ 371 (c)(1),
(2) Date: Sep. 30, 2021

(87) PCT Pub. No.: WO2020/200803
PCT Pub. Date: Oct. 8, 2020

(65) Prior Publication Data
US 2022/0204784 A1    Jun. 30, 2022

(30) Foreign Application Priority Data

Apr. 3, 2019   (EP) .................... 19167026

(51) Int. Cl.
| | | |
|---|---|---|
| *C11D 3/30* | (2006.01) | |
| *B08B 3/08* | (2006.01) | |
| *B08B 3/10* | (2006.01) | |
| *C02F 1/54* | (2023.01) | |
| *C09D 9/00* | (2006.01) | |
| *C11D 3/20* | (2006.01) | |
| *C11D 3/43* | (2006.01) | |
| *C11D 7/26* | (2006.01) | |
| *C11D 7/32* | (2006.01) | |
| *C11D 7/50* | (2006.01) | |
| *C02F 101/32* | (2006.01) | |
| *C02F 103/14* | (2006.01) | |

(52) U.S. Cl.
CPC .................. *C09D 9/00* (2013.01); *B08B 3/08* (2013.01); *B08B 3/10* (2013.01); *C02F 1/54* (2013.01); *C11D 3/2068* (2013.01); *C11D 3/30* (2013.01); *C11D 7/263* (2013.01); *C11D 7/3218* (2013.01); *C02F 2101/322* (2013.01); *C02F 2103/14* (2013.01)

(58) Field of Classification Search
CPC ......... C11D 3/2068; C11D 3/30; C11D 7/263; C11D 7/3218; B08B 3/08; B08B 3/10
USPC ....... 510/118, 134, 201, 202, 203, 206, 499, 510/505, 506; 134/38, 39, 40, 41, 42
See application file for complete search history.

(56) References Cited

U.S. PATENT DOCUMENTS

| | | | | |
|---|---|---|---|---|
| 5,854,190 | A * | 12/1998 | Knipe, Jr. ............... | B05B 15/55 510/435 |
| 5,972,865 | A * | 10/1999 | Knipe, Jr. ............... | B05B 15/55 510/210 |
| 6,887,837 | B2 * | 5/2005 | Wilson ..................... | C09D 9/00 510/202 |
| 2008/0210266 | A1 * | 9/2008 | Law ........................ | C09D 9/005 134/38 |
| 2011/0094545 | A1 | 4/2011 | Tanaka | |
| 2022/0098519 | A1 * | 3/2022 | Naganuma ......... | C11D 17/0008 |

FOREIGN PATENT DOCUMENTS

| | | | | |
|---|---|---|---|---|
| CN | 109517677 | A | 3/2019 | |
| EP | 07119789 | * | 5/2008 | |
| JP | 2013010888 | A | 1/2013 | |
| JP | 2015178599 | A | 10/2015 | |
| WO | WO-02053802 A1 | * | 7/2002 | ............... C09D 9/00 |
| WO | 02085994 A1 | | 10/2002 | |
| WO | WO-2010075129 A2 | * | 7/2010 | .......... B01F 17/0021 |
| WO | 2012067962 A1 | | 5/2012 | |
| WO | WO-2020153424 A1 | * | 7/2020 | ............... C11D 1/04 |

OTHER PUBLICATIONS

International Search Report and Written Opinion for corresponding PCT/EP2020/057566 mailed Apr. 23, 2020, 9 Pages.
European Search Report for EP Patent Application No. 19167026.4, Issued on Sep. 12, 2019, 3 pages.

* cited by examiner

*Primary Examiner* — Gregory R Delcotto
(74) *Attorney, Agent, or Firm* — Armstrong Teasdale LLP

(57) ABSTRACT

Described herein is a method for purging paint circuits coated with a non-cured paint with improved cleaning efficiency and a reduced COD (Chemical Oxygen Demand) in the wastewater, where a paint circuit is brought into contact with a waterborne purge cleaner solution including at least one glycolether and which additionally includes at least one water-soluble amine having at least 7 carbon atoms. Also described herein is a waterborne purge cleaner solution with improved cleaning efficiency and reduced VOC (Volatile Organic Compound) content as well as a concentrate for producing the purge cleaner solution.

15 Claims, No Drawings

METHOD FOR PURGING PAINT CIRCUITS AND WATERBORNE PURGE CLEANER

CROSS-REFERENCE TO RELATED APPLICATIONS

This application is a U.S. National Phase Application of International Patent Application No. PCT/EP2020/057566, filed Mar. 19, 2020, which claims priority to European Patent Application No. 19167026.4, filed Apr. 3, 2019, the entire contents of which are hereby incorporated by reference herein.

The present invention relates to a method for purging paint circuits coated with a non-cured paint, said method exhibiting an improved cleaning efficiency and a reduced COD (Chemical Oxygen Demand) in the wastewater. Moreover, the invention refers to a waterborne purge cleaner solution with improved cleaning efficiency and reduced VOC (Volatile Organic Compound) content as well as to a concentrate for producing the purge cleaner solution.

In waterborne paint workshops, purge cleaners so-called paint strippers are used to clean the paint circuits, which are closed circuits between the paint mixing room and the paint booths where the car bodies are painted, in manual or robotic applications. Said circuits include pumps, hoses, nozzles, tanks and tubes the latter being made of e.g. stainless steel or polyethylene. The purge cleaners must clean efficiently in the shortest time to avoid any contamination when changing from one paint color to another in the paint booths.

Purge cleaners are sold in concentrated form, i.e. as a concentrate which is then diluted by the customer before cleaning the paint circuits. However, purge cleaners may also be sold in RTU (Ready to Use) form not requiring dilution.

Waterborne purge cleaners containing water-soluble organic solvents such as glycolethers and certain amines like diethanolamine or triethanolamine are known from the prior art.

However, there is still a demand for improved cleaning efficiency as well as for reduced VOC content of said cleaners.

VOCs (Volatile Organic Compounds) such as organic solvents should nowadays be avoided where even possible due their impact on health and environment. Regarding the wastewater produced when purging paint circuits, the COD (Chemical Oxygen Demand) which is a measure for the organic charge should be as low as possible.

Therefore, it has been an object of the present invention to provide a method for purging paint circuits coated with a non-cured paint exhibiting an improved cleaning efficiency as well as a reduced COD in the wastewater.

This object has been solved by a method according to the present invention for purging paint circuits coated with a non-cured paint, wherein a paint circuit is brought into contact with a waterborne purge cleaner solution comprising at least one glycolether and which additionally comprises at least one water-soluble amine having at least 7 carbon atoms.

Definitions

In the sense of the present invention, "waterborne purge cleaner solution" means that more than 50% (w/w) of the according purge cleaner solution, i.e. of the RTU form, is water.

"Water-soluble amine" means that at room temperature (25° C.) and under atmospheric pressure (1,013 mbar) at least 1 g/l, preferably at least 100 g/l and especially preferably at least 1,000 g/l of the according amine is completely soluble in deionized water.

According to the present invention, "VOCs", i.e. "Volatile Organic Compounds" are organic compounds having a vapor pressure of at least 0.01 kPa at 20° C. as defined in the Council Directive 1999/13/EC of Mar. 11, 1999.

According to the present invention, "COD", i.e. "chemical oxygen demand" means the amount of oxygen that can be consumed by reactions in a measured solution. It is commonly expressed in mass of oxygen consumed over volume of solution which in SI units is milligrams per liter (mg/l).

"% (w/w)" means wt.-%, i.e. weight percent.

Preferably, the at least one glycolether in the waterborne purge cleaner solution comprises at least one glycolether having an alkyl group with 6 to 10 carbon atoms.

More preferably, the at least one glycolether in the purge cleaner solution comprises hexylglycol and/or hexyldiglycol, even more preferably, it comprises hexyldiglycol. Even more preferably, it comprises or is a mixture of hexylglycol and hexyldiglycol. Preferably, the at least one water-soluble amine having at least 7 carbon atoms comprises at least one amine having 7 to 15 carbon atoms, more preferably having 7 to 12 carbon atoms.

In the purge cleaner solution, the at least one amine preferably comprises at least one amine having a conjugated acid with a pKa of at least 8.0, preferably of at least 8.3 and more preferably of at least 8.6. Due to its high basicity, such an amine improves the cleaning efficiency of the according purge cleaner especially for dried paints. For example, the conjugated acid of N-methyldiisopropylpropanolamine (MDIPOA) has a pKa of 8.71, wherein in case of triethanolamine (TEA) the pKa is only 7.86 resulting in reduced cleaning efficiency.

Preferably, the at least one amine comprises at least one tertiary amine having at least one hydroxyalkyl group, wherein the at least one tertiary amine preferably has one to three hydroxyalkyl groups preferably selected from the group consisting of 2-hydroxyethyl and 2-hydroxypropyl and zero to two alkyl groups preferably selected from the group consisting of linear alkyl groups having 1 to 8 carbon atoms, with the proviso that the sum of the hydroxyalkyl groups and the alkyl groups is three.

More preferably, the at least one amine comprises at least one amine selected from the group consisting of N-methyldiisopropanolamine, N-octyldiethanolamine, triisopropanolamine and N,N-dibutylethanolamine (DBEOA), preferably selected from the group consisting of N-methyldiisopropanolamine, triisopropanolamine and N,N-dibutylethanolamine, and more preferably comprises N-methyldiisopropanolamine.

The log $P_{oct/wat}$ value of the at least one amine is preferably in the range of −0.5 to +3.0 at a temperature of 25° C. and a pH value of 10.3. Said value refers to the HLB (hydrophilic-lipophilic balance) of the amine and is defined as follows:

$$\log P_{oct/wat} = \log\left(\frac{[\text{solute}]_{octanol}^{un-ionized}}{[\text{solute}]_{water}^{un-ionized}}\right),$$

wherein the at least one amine is the un-ionized solute. The cleaning efficiency achieved with such amines is especially high. For N-methyldiisopropanolamine the log $P_{oct/wat}$ value is −0.03.

The purge cleaner solution comprises at least one water-soluble amine having at least 7 carbon atoms. This is advantageous, because in comparison with amines having a lower number of carbon atoms such as triethanolamine said at least one amine exhibits a lower surface tension and may, thus, acts like a surfactant. Consequently, adding a surfactant like a conventional anionic, cationic, zwitterionic or non-ionic surfactant to the purge cleaner solution is not required, such that the purge cleaner solution preferably does not contain any surfactants. Accordingly, a concentrate from which the purge cleaner solution is obtainable by diluting preferably does not contain any surfactants as well.

Preferably, the purge cleaner solution does not contain diethanolamine, dimethylethanolamine or triethanolamine, more preferably it does not contain any amines having less than 7 carbon atoms.

Since organic solvents, especially benzylalcohol and butylglycol, as well as surfactants are regarded as VOCs and lead to a high COD in the wastewater, it is desirable to reduce their content in the purge cleaner solution and an according concentrate.

Therefore, the purge cleaner solution preferably does not contain any organic solvents selected from the group consisting of benzylalcohol and butylglycol, more preferably selected from the group consisting of benzylalcohol, butylglycol and butyldiglycol, more preferably selected from the group consisting of benzylalcohol and glycolethers having 6 to 10 carbon atoms except hexylglycol and hexyldiglycol, and most preferably does not contain any organic solvents except hexylglycol and hexyldiglycol.

In case the purge cleaner solution contains at least one alcohol, it preferably does not contain any alcohols with less than 5, more preferably with less than 6, and even more preferably with less than 7 carbon atoms, as these alcohols exhibit a high vapor pressure. In particular, the purge cleaner solution only contains benzylalcohol, which has 7 carbon atoms, as an alcohol.

In case the purge cleaner solution contains at least one glycolether besides hexylglycol and hexyldiglycol, it preferably does not contain any glycolether having an alkyl group with less than 5, more preferably with less than 6 carbon atoms, as these glycolethers exhibit a high vapor pressure. In particular, the purge cleaner solution only contains hexylglycol and/or hexyldiglycol.

The waterborne purge cleaner solution does not require any chelating agents for the effective purging of paint circuits. Thus, the purge cleaner solution preferably does not contain any chelating agents.

Moreover, the method according to the present invention does not require a post-rinse step, e.g. with water, for effectively purging paint circuits. Hence, the method preferably does not comprise a post-rinse step following the step of bringing into contact the paint circuit to be purged with the purge cleaner solution.

The present invention also relates to a waterborne purge cleaner solution, i.e. an RTU form, which exhibits an improved cleaning efficiency as well as a reduced VOC content.

Preferably, the at least one glycolether in the purge cleaner solution comprises hexylglycol and/or hexyldiglycol, more preferably, it comprises hexyldiglycol. Even more preferably, it comprises or is a mixture of hexylglycol and hexyldiglycol. Preferably, the at least one water-soluble amine having at least 7 carbon atoms comprises at least one amine having 7 to 15 carbon atoms, more preferably having 7 to 12 carbon atoms.

According to a preferred embodiment, the purge cleaner solution comprises
a) 0.05 to 0.50% (w/w) of at least one water-soluble amine having 7 to 15 carbon atoms calculated as N-methyl-diisopropanolamine,
b) 0.3 to 1.0% (w/w) of hexylglycol and
c) 0.3 to 1.0% (w/w) of hexyldiglycol.

According to an especially preferred embodiment, the purge cleaner solution consists of
a) 0.05 to 0.50% (w/w) of at least one water-soluble amine having 7 to 15 carbon atoms calculated as N-methyl-diisopropanolamine,
b) 0.3 to 1.0% (w/w) of hexylglycol,
c) 0.3 to 1.0% (w/w) of hexyldiglycol and
d) 0 to 0.2% (w/w) of at least one low-foaming surfactant,
e) 0 to 0.4% (w/w) of benzylalcohol and
f) 0 to 0.8% (w/w) of at least one other glycolether with 6 to 10 carbon atoms, including butylglycol and butyldiglycol, wherein the % (w/w) of all components a) to f) and of water sum up to 100% (w/w).

Further preferred embodiments of the purge cleaner solution correspond to the preferred embodiments of the method according to the invention as described above.

Moreover, the present invention refers to a concentrate for producing the waterborne purge cleaner solution according to the invention, from which the purge cleaner solution is obtainable by diluting a concentrate according to the invention with water, preferably by 5:1,000 to 50:1,000 (5 to 50 g concentrate for 1,000 g cleaner solution), more preferably by 5:1,000 to 30:1,000 (5 to 30 g concentrate for 1,000 g cleaner solution) and especially preferably by 14:1,000 to 26:1,000 (14 to 26 g concentrate for 1,000 g cleaner solution), and adjusting the pH value, if required, with at least one acid or base.

According to the invention, the amount of concentrate required for producing the purge cleaner solution is lower than in case of the prior art concentrates which are usually diluted by 35:1,000 to 100:1,000 helping to reduce the VOC content of the purge cleaner solution as well as the COD in the resulting waste water. This may be explained due to the higher cleaning efficiency achieved by the at least one water-soluble amine having at least 7 carbon atoms.

According to a preferred embodiment the concentrate comprises
a) 1 to 40% (w/w) of at least one water-soluble amine having 7 to 15 carbon atoms calculated as N-methyl-diisopropanolamine,
b) 40 to 60% (w/w) of hexylglycol and
c) 40 to 60% (w/w) of hexyldiglycol.

According to an especially preferred embodiment, the concentrate consists of
a) 1 to 40% (w/w) of at least one water-soluble amine having 7 to 15 carbon atoms calculated as N-methyl-diisopropanolamine,
b) 40 to 60% (w/w) of hexylglycol,
c) 40 to 60% (w/w) of hexyldiglycol,
d) 0 to 10% (w/w) of at least one low-foaming surfactant,
e) 0 to 30% (w/w) of benzylalcohol and
f) 0 to 80% (w/w) of at least one other glycolether with 6 to 10 carbon atoms, including butylglycol and butyldiglycol,
wherein the % (w/w) of all components a) to f) sum up to 100% (w/w).

The invention should be illustrated by the following inventive and comparative examples which are, however, not meant to limit the scope of the invention.

EXAMPLES

Test 1: Quantitative 9 Drops Test on Wet Paint 5 Min. at RT:

A waterborne paint layer with a thickness between 40 to 60 µm was extended on a glass panel (200×200 mm). The layer was then partially dried for 4 minutes at room temperature (RT) and placed at a slope of 45°. At a rate of 1 drop per second and from a height of 12 cm, 9 drops of the purge cleaner solution to be tested were added onto the panel.

After 5 minutes at room temperature, the width of the paint-free spot where the drops had hit the panel ("open head"), in cm was measured. The larger the width, the better the stripping effect, i.e. the cleaning efficiency, of the tested solution.

Test 2: Spray on Wet Paint Test 10 Min. at RT:

A waterborne paint layer with a thickness of approx. 60 µm was extended on a glass panel (100×200 mm). The layer was then partially dried for 4 minutes at room temperature and placed at a slope of 45°. From 30 cm distance, 10 ml of the purge cleaner solution to be tested were sprayed on the panel.

After 10 minutes at room temperature, the stripping effect, i.e. the cleaning efficiency, was evaluated according to the following categories: Bad (−), regular (+), good (++) and very good (+++).

Test 3: Quantitative N Drops Test on Dried Paint:

A waterborne paint layer with a thickness between 40 to 60 µm was extended on a glass panel (200×200 mm). The layer was then dried for 24 h at room temperature and placed at a slope of 45°. At a rate of 1 drop per second and from a height of 12 cm, drops of the purge cleaner solution to be tested were added onto the panel until the layer was opened, i.e. until there was a paint-free spot where the drops had hit the panel.

The number of drops (n) added was determined. The lower the number, the better the stripping effect, i.e. the cleaning efficiency, of the tested solution.

Purge Cleaner Solutions and Test Results:

For every amine A, B and C (see below), a mixture of 95 wt.-% of hexyldiglycol and 5 wt.-% of amine was prepared.

Amine A: Triethanolamine (6 carbon atoms) (comparative example)

Amine B: N-methyldiisopropanolamine) (7 carbon atoms) (inventive example)

Amine C: N,N-dibutylethanolamine (10 carbon atoms) (inventive example)

The mixtures were diluted with deionized water to 2 wt.-%.

The Quantitative 9 Drops Test was performed as described above (Test 1) on the wet paint "Füller Red" (Hemmelrath, Germany).

The results are summarized in the following table wherein the cleaning efficiency was calculated compared to the one with triethanolamine (amine A) which was considered as reference.

| Amine | Width of open head in cm | Cleaning efficiency in % |
|---|---|---|
| A | 1.45 | 100 |
| B | 1.51 | 104 |
| C | 1.48 | 102 |

The Spray Test was conducted as described above (Test 2) on the wet paint "Füller Red" (Hemmelrath, Germany) as well and showed the following results:

| Amine | Cleaning efficiency |
|---|---|
| A | + |
| B | + to ++ |
| C | ++ |

For amines A and B, the Quantitative N Drops Test was performed as described above (Test 3) on the dried paint "Füller Red" (Hemmelrath, Germany). The results are summarized in the following table. The cleaning efficiency was calculated compared to the one with triethanolamine (amine A) as a reference.

| Amine | Number of drops (n) | Cleaning efficiency in % |
|---|---|---|
| A | 20 | 100 |
| B | 9 | 222 |

Surprisingly, all tests revealed an improved cleaning efficiency of the inventive purge cleaner solutions containing a water-soluble amine with at least 7 carbon atoms (amines B and C) compared to a purge cleaner solution which contains an amine having 6 carbon atoms (amine A).

The invention claimed is:

1. A method for purging a paint circuit coated with a non-cured paint, comprising bringing the paint circuit into contact with a waterborne purge cleaner solution comprising at least one glycolether characterized in that it additionally comprises at least one water-soluble amine having 7 to 15 carbon atoms, wherein the waterborne purge cleaner solution does not comprise any organic solvents other than the at least one glycolether and does not comprise any surfactants.

2. The method according to claim 1 characterized in that the at least one glycolether comprises hexylglycol and/or hexyldiglycol.

3. The method according to claim 1 characterized in that the at least one water-soluble amine comprises at least one amine having 7 to 12 carbon atoms.

4. The method according to claim 1 characterized in that the purge cleaner solution comprises
   a) 0.05 to 0.50% (w/w) of at least one water-soluble amine having 7 to 15 carbon atoms,
   b) 0.3 to 1.0% (w/w) of hexylglycol, and
   c) 0.3 to 1.0% (w/w) of hexyldiglycol.

5. The method according to claim 1 characterized in that the at least one amine comprises at least one amine having a conjugated acid with a pKa of at least 8.0.

6. The method according to claim 1 characterized in that the at least one amine comprises at least one tertiary amine having at least one hydroxyalkyl group.

7. The method according to claim 6 characterized in that the at least one tertiary amine has one to three hydroxyalkyl groups.

8. The method according to claim 7 characterized in that the at least one amine comprises at least one amine selected from the group consisting of N-methyldiisopropanolamine, N-octyldiethanolamine, triisopropanolamine and N,N-dibutylethanolamine.

9. The method according to claim 1 characterized in that the at least one glycolether comprises hexyldiglycol.

10. The method according to claim 1 characterized in that the at least one water-soluble amine comprises at least one amine having 7 to 12 carbon atoms.

11. The method according to claim 1 characterized in that the at least one amine comprises at least one amine having a conjugated acid with a pKa of at least 8.3.

12. The method according to claim 6 characterized in that the at least one tertiary amine has one to three hydroxyalkyl groups selected from the group consisting of 2-hydroxyethyl and 2-hydroxypropyl and zero to two alkyl groups, with the proviso that the sum of the hydroxyalkyl groups and the alkyl groups is three.

13. The method according to claim 7 characterized in that the at least one amine comprises at least one amine selected from the group consisting of N-methyldiisopropanolamine, triisopropanolamine and N,N-dibutylethanolamine.

14. The method according to claim 1 characterized in that the at least one glycoether comprises at least one glycoether having an alkyl group with 6 to 10 carbon atoms.

15. The method according to claim 1 characterized in that the solution does not comprise any amines having less than 7 carbon atoms.

\* \* \* \* \*